No. 727,726. PATENTED MAY 12, 1903.
P. H. WHITE.
SPEED CHANGING GEAR.
APPLICATION FILED AUG. 22, 1902.
NO MODEL.
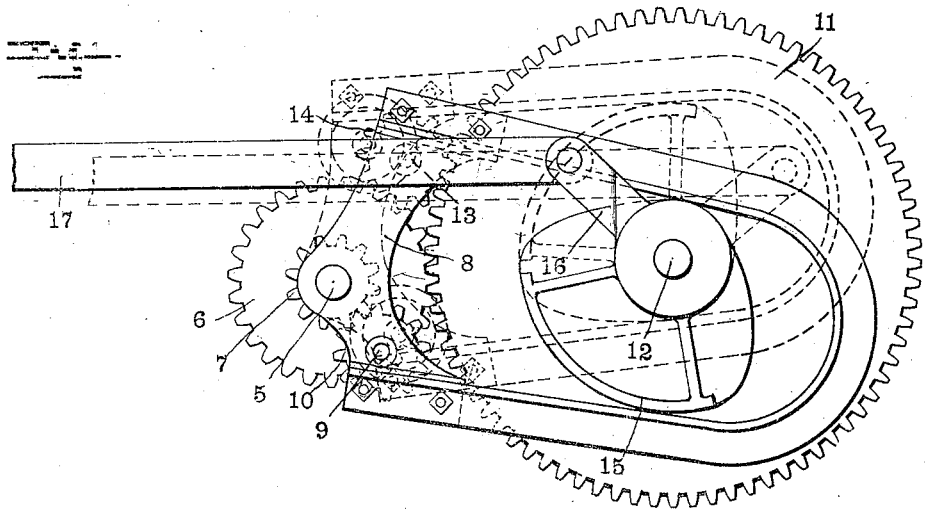
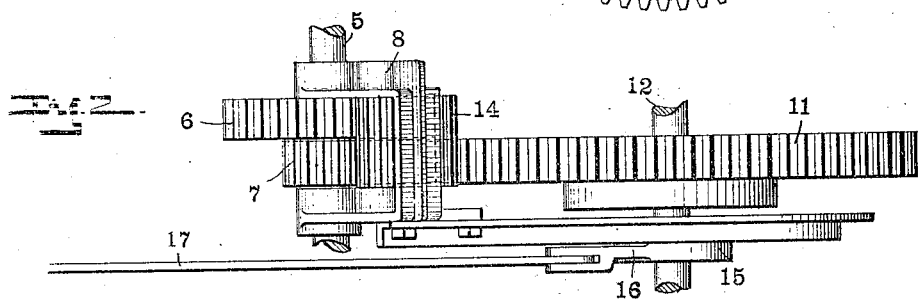
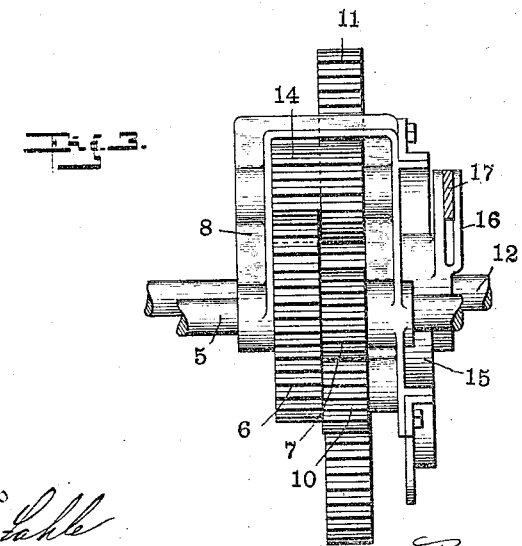
Inventor
Paul H. White
By
Bradford & Hood
Attorneys
Witnesses No. 727,726.

Patented May 12, 1903.

UNITED STATES PATENT OFFICE.

PAUL H. WHITE, OF INDIANAPOLIS, INDIANA, ASSIGNOR TO WHITE STEAM WAGON COMPANY, OF INDIANAPOLIS, INDIANA, A CORPORATION OF INDIANA.

SPEED-CHANGING GEAR.

SPECIFICATION forming part of Letters Patent No. 727,726, dated May 12, 1903.

Application filed August 22, 1902. Serial No. 120,619. (No model.)

*To all whom it may concern:*

Be it known that I, PAUL H. WHITE, a citizen of the United States, residing at Indianapolis, in the county of Marion and State of Indiana, have invented certain new and useful Improvements in Speed-Changing Gear, of which the following is a specification.

The object of my present invention is to provide a simple, efficient, and easily-operated two-change speed-gear especially designed for heavy transmission.

The accompanying drawings illustrate my invention.

Figure 1 is a side elevation. Fig. 2 is a plan view, and Fig. 3 is an end elevation.

In the drawings, 5 indicates the driving-shaft, to which are secured two gear-wheels 6 and 7, the gear-wheel 7 in the present case being smaller than the gear 6. Pivoted upon shaft 5 is a frame 8. Frame 8 carries on one side of shaft 5 a stud-shaft 9, upon which is journaled a pinion 10, meshing with gear 7 and adapted to be thrown into mesh with a driven gear 11, carried by the driven shaft 12, said gear 11 being preferably arranged in the plane of the gears 7 and 10. Frame 8 also carries a second stud-shaft 13, upon which is journaled a pinion 14, meshing with the gear 6, said pinion being of sufficient length to extend from the plane of gear 6 to the plane of gear 11, and its arrangement being such that by swinging frame 8 upon shaft 5 pinion 14 may be thrown into and out of mesh with gear 11. Pivoted upon shaft 12 is a cam 15, which fits within and controls frame 8, said cam being swung upon its center by means of a suitable arm 16 and link 17 pivoted thereto.

When cam 15 is thrown into the position shown in full lines in Fig. 1, frame 8 has been swung thereby so as to move pinion 14 into mesh with gear 11, thus forming a driving connection between gear 6 and gear 11, while pinion 10 has been thrown out of mesh with gear 11 and is thus rotated freely upon its journal by the rotation of gear 7. By a pull upon link 17 the cam may be thrown into the position shown in dotted lines in Fig. 1, thus swinging frame 8 so as to withdraw pinion 14 from mesh with the gear 11 and so as to throw pinion 10 into mesh with gear 11, thus forming a driving connection between the gear 7 and gear 11.

I claim as my invention—

1. In a speed-changing gear, the combination, with a driving-shaft, a pair of driving-gears carried thereby, a driven shaft, and a driven gear carried thereby substantially in the plane of one of the driving-gears; of a frame pivoted upon the driving-shaft, a pair of pinions carried by the frame, one of said pinions meshing with the driven gear and the driving-gear which is in substantially the same plane while the other of said pinions is of a length sufficient to extend from the driven gear to the plane of the other driving-gear, and means for swinging said frame so as to bring one or the other of said pinions into mesh with the driven gear.

2. In a speed-changing gearing, the combination with a driving-shaft, a pair of driving-gears carried thereby, a driven shaft, and a driven gear carried thereby, of a frame pivoted upon the driving-shaft, a pair of pinions carried by the frame and each meshing with one of the driving-gears, a cam mounted upon the driven shaft and engaging the frame, and means for swinging the cam whereby the frame may be swung so as to move one or the other of said pinions into mesh with the driven gear while the other of said pinions is thrown out of mesh.

In witness whereof I have hereunto set my hand and seal, at Indianapolis, Indiana, this 18th day of August, A. D. 1902.

PAUL H. WHITE. [L. S.]

Witnesses:
 ARTHUR M. HOOD,
 JAMES A. WALSH.